Jan. 16, 1962    A. S. McKAY ETAL    3,016,961
RADIOACTIVITY GEOPHYSICAL PROSPECTING
Filed Aug. 13, 1957    3 Sheets-Sheet 1

Jan. 16, 1962  A. S. McKAY ETAL  3,016,961
RADIOACTIVITY GEOPHYSICAL PROSPECTING
Filed Aug. 13, 1957  3 Sheets-Sheet 2

Jan. 16, 1962 A. S. McKAY ETAL 3,016,961
RADIOACTIVITY GEOPHYSICAL PROSPECTING
Filed Aug. 13, 1957 3 Sheets-Sheet 3

United States Patent Office 3,016,961
Patented Jan. 16, 1962

3,016,961
RADIOACTIVITY GEOPHYSICAL PROSPECTING
Alexander S. McKay and Hugh E. Hall, Jr., Bellaire, Tex., assignors to Texaco Inc., a corporation of Delaware
Filed Aug. 13, 1957, Ser. No. 677,968
20 Claims. (Cl. 175—41)

The present invention relates generally to the detection and measurement of penetrative radiation, such as gamma rays, neutrons and the like. More particularly, the invention is concerned with the detection of penetrative radiation and recording of the detected radiation on photographic film. Thus, it is a general object of the present invention to provide improvements in the detection and measurement of penetrative radiation.

The invention is of particular utility as applied to the detection and measurement of penetrative radiation in a self-contained well logging instrument.

In order to analyze the earth formations traversed by a bore hole through the surface of the earth, such as those drilled in search of petroleum, it is well known to employ apparatus suitable for the detection of penetrative radiation in conjunction with conductive cables or the like in order to convey an electrical signal from the detector in the well bore to suitable apparatus at the surface of the earth where the signal may be displayed, as by means of a meter or appropriate recording apparatus. In certain instances, however, it is desirable to avoid the use of conductors or the like to convey the detector output signal to the surface of the earth. Apart from the obvious inconveniences and expense entailed in the use of suitable conductive cables, especially in deep wells of the order of 10,000 to 20,000 feet or more in depth, it is often desirable to conduct radioactivity logs of earth formations under conditions where the presence of such a cable would impede or prevent other necessary operations. For example, it is often considered desirable to conduct a radioactivity log during the course of actual drilling of the bore hole. Such a log provides useful information concerning the nature of the earth formations through which the drill is passing without necessitating further interruption of the drilling operation while a separate log is conducted. Moreover, the making of a log during the drilling operation assures that the log is conducted prior to subsequent contamination of the well, such as by the drilling fluid. A method and apparatus for conducting a gamma ray log while drilling a bore hole are shown in U.S. Patent No. 2,374,197, granted April 24, 1945, to D. G. C. Hare. In accordance with the Hare patent, the output of a gamma ray detector positioned within the bore hole is transmitted to the surface of the earth where it is amplified and recorded. The problem of transmitting the output of the gamma ray detector to the surface poses a serious problem in the practice of logging while drilling. Thus, it is an object of the invention to provide self-contained means for conducting a radioactivity bore hole log without the need for conductive cables extending from the logging instrument to the surface.

It is a further object of the invention to provide improved self-contained bore hole logging apparatus for conducting a radioactivity well log during the course of drilling a well bore.

It is a still further object of the invention to provide improved radioactivity geophysical exploration apparatus involving the recording of a signal on photographic film in response to detected penetrative radiation.

The use of photographic film to record a signal indicative of penetrative radiation within a well bore provides a useful method of obtaining a permanent record of the detected radiation. However, the conditions found in a bore hole, especially relatively deep bore holes, pose serious problems. For example, the temperature within a well bore may range upwards of 300° F. and, in fact, may reach temperatures of the order of 350 to 400° F. in deep wells. Especially in the case of a logging while drilling apparatus where the film must be kept in such a high temperature environment for relatively long periods of time, such temperature conditions may be of relatively serious consequence. Accordingly, it is a more specific object of the present invention to provide improvements in self-contained well logging directed toward overcoming the adverse effect of relatively high temperatures environment on the photographic film.

Another problem associated with the recording of a signal on photographic film corresponding to detected penetrative radiation is that of variations in the relative density of the photographic film due to such things as changes in ambient temperature within the well, and variations due to inconsistencies in the photographic film itself and which may arise as a result of the process of manufacture or development of the film. Accordingly, it is still another object of the present invention to provide improvements directed toward overcoming the problem of variations in density in the photographic film due to such causes.

Briefly stated, in accordance with the present invention, penetrative radiation is detected and converted to a corresponding light signal which is employed to fog a strip of photographic film in accordance with the quantity of radiation detected. The photographic film is maintained in a moisture-free oil bath. The oil bath serves as an optical link to couple the light signal to the photographic film.

Preferably, the radiation is detected by means of a luminophor and the photographic strip is moved past the luminophor at a predetermined rate. The luminophor is optically coupled to the photographic strip by means of an oil media. Advantageously, the entire quantity of film is maintained within the oil bath. The luminophor may also be maintained in the oil bath for temperature stabilization purposes.

Preferably, a monitor luminophor together with a source of radioactivity of predetermined intensity is also mounted next to a separate portion of the photographic film in the vicinity of the radiation-detecting luminophor in order to fog a portion of the film as a reference.

A preferred embodiment of the invention is concerned with coupling a luminophor to a photographic film which is maintained in an oil bath while mounted within a drill string within the vicinity of a drill bit during the course of drilling a well.

For additional objects and advantages, and for a better understanding of the invention, attention is now directed to the following description and accompanying drawings. The features of the invention that are believed to be novel are particularly pointed out in the appended claims.

Figures 1, 2, 3:
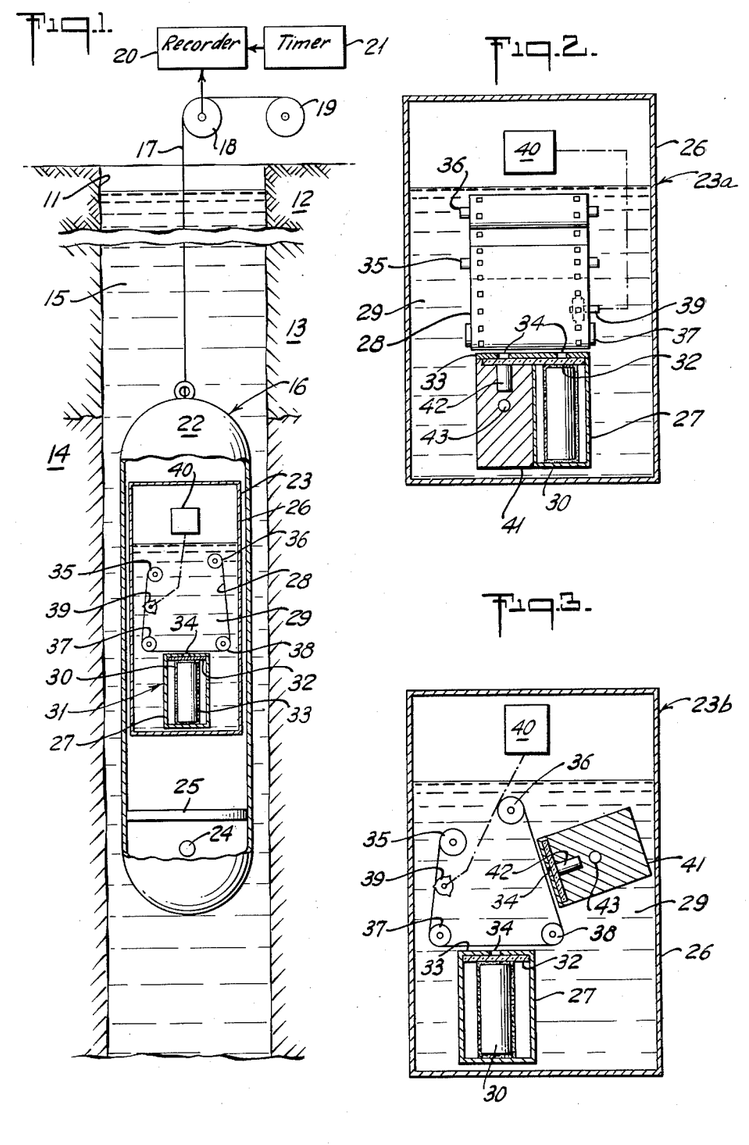
FIGURE 1 is a vertical elevation, partly in cross-section, through a portion of a bore hole showing suspended therein a well-logging instrument constructed in accordance with principles of the invention and including a self-contained radiation detection and recording unit.
FIGURE 2 is a side elevation, partly in cross-section, showing apparatus comprising a further embodiment of the self-contained unit portion of the instrument illustrated in FIGURE 1.
FIGURE 3 is a side-elevation, partly in cross-section, showing still another embodiment of the self-contained unit shown in FIGURES 1 and 2.

Referring now to FIGURE 1, there is shown a bore hole 11 passing through a series of earth formations 12, 13, 14 and containing the usual bore hole fluid 15 which may comprise drilling mud, oil or water, for example. Within the bore hole 11, there is shown a logging instrument 16 suspended by means of a simple wire-line type cable 17. At the surface of the earth there is shown diagrammatically a measuring device 18 in contact with the cable 17, and which is suitable for determining the length of the cable extending into the bore hole at any given time. The end of the cable 17 located at the surface of the earth is affixed to a cable reel 19 which may include appropriate means for reeling the cable 17 and the instrument 16 in or out of the bore hole 11. Display means, shown as a recorder 20, is coupled to the cable measuring device 18. A timer 21 is also shown coupled to the recorder 20. The measuring device 18 together with the timer 21 provides means for correlating the position of the instrument 16 in the bore hole 11 with time and the recorder 20 provides a record of the position of the instrument 16 in the bore hole 11 in correlation with time.

The logging instrument 16 comprises a self-contained unit for detecting and recording penetrative radiation within the bore hole 11 at various locations throughout its depth. The instrument 16 comprises an outer casing 22 constructed in accordance with known principles to withstand the conditions of temperature and pressure usually encountered in a bore hole. Within the housing 22 there is provided a self-contained radiation detection and recording unit 23 embodying principles of the invention. As hereinafter explained in greater detail, the unit 23 may be made selectively sensitive to a particular type of radiation to be detected. The unit 23 includes a detector which may be of a type sensitive to gamma rays or it may be one that is sensitive to neutrons, as determined by the type of radioactivity log to be made. Within the housing 22, below the self-contained unit 23 and spaced therefrom a predetermined distance, for example, of the order of 3 to 20 inches, there may be provided a source of primary radiation 24. The source 24 may comprise a source of gamma ray or neutron radiation of conventional type, as is well known in the art. Intermediate the unit 22 and the source 24, there may be provided a shield 25 for preventing radiation produced by the source 24 from passing directly to the unit 23. It is to be understood that the type of radiation emitted by the source, e.g., neutrons, gamma rays or a combination of both, and the sensitivity of the detector, as well as the shielding characteristic of the shield 25, are to be determined in accordance with well-known principles, depending upon the type of radioactivity log to be conducted, as for example a gamma-gamma log, neutron-neutron log, neutron-gamma log, or a combination of a plurality of these types or of one or more of these with a natural gamma log. It is to be understood that in the case of a natural gamma log, per se, the source 24 and shield 25 are unnecessary.

The self-contained unit 23 comprises a housing 26 containing a radiation detector in the form of a scintillator 27 for producing light pulses in response to detected radiation and means for moving a strip of photographic film 28 past the scintillator 27. At least the film and advantageously in certain embodiments of the invention, both the scintillator 27 and the film 28 are submerged in a bath of oil 29 which also serves to couple the light output from the scintillator 27 to the film 28. It has been discovered that the oil increases the amount of light coupled from the scintillator 27 to the film 28 by a factor of 2½. The oil should be substantially moisture-free and relatively transparent to the light rays emitted by the scintillator 27. In order to assure that the oil is moisture free, it should be boiled to expel moisture therefrom prior to use. Ordinarily, the emulsion of typical photographic film is adversely affected by the presence of water or water vapor when heated above approximately 100° F. The moisture-free oil bath of the present invention overcomes that difficulty.

The scintillator 27 comprises a phosphor, i.e., luminophor 30 enclosed within an aluminum container 31 and having a glass-cover-seal 32 over its top portion. In order to confine and concentrate light emitted by the luminophor 30, a coating of aluminum oxide or a layer of aluminum foil is applied to the top of the container 31 and the layer or coating 33 is provided with a small hole that should be approximately 1/16″ to 3/8″ in diameter. A 1/8″ diameter hole has been found very satisfactory. One of the advantages of confining the light output of the luminophor 30 to a relatively small area is to assure that the film density remains relatively constant over the exposure region.

In the event that gamma rays are to be detected, the luminophor 30 may comprise a shielded sodium iodide crystal with the shield having an outer coating of boron to prevent activation of the crystal through neutron irradiation, if and when the latter is present. For the measurement of slow or thermal neutrons, a lithium iodide phosphor may be employed as the luminophor 30. In this case an appropriate shield should surround the luminophor to eliminate gamma rays from the neutron signal. A lead or tungsten shield may be employed to shield the gamma rays. For the detection of fast neutrons, the luminophor may comprise a plastic phosphor, such as one of those disclosed in U.S. Patent No. 2,559,219, Ludeman.

The photographic film 28 is preferably provided with equally-spaced notches or perforations along one or both edges thereof, as in the case of 35 mm. motion picture film. The film strip 28 is mounted on a film transport assembly comprising a film takeup spool 35 and a film supply spool 36 and intermediate film rollers 37 and 38. The takeup and supply spools 35, 36 may be encased in light-tight cartridges to facilitate handling of the film before and after a logging run. Means for moving the film 28 from the supply spool 35 past the scintillator 27 to the takeup spool 35 are shown diagrammatically as a sprocket wheel 39 which engages the perforations in the film 28. The sprocket wheel is driven by an appropriate motor mechanism 40 which may be coupled thereto as by means of an appropriaate gear train or belt drive arrangement, represented schematically by the dashed line. The motor 40 may be a mechanical clock-work type mechanism or, preferably, a constant speed electric motor which receives its power from a long-life battery (not shown).

The film transport assembly provides means for moving the film past the scintillator at a predetermined rate and preferably provides means for moving the film intermittently a sufficient distance to expose successive discrete portions thereof to the light output of the scintillator. The dwelltime between successive movements of the film determines the duration that the film is exposed to the output of the scintillator and thus governs the time during which radiation is detected and measured. Although other means may be employed to transport the film intermittently past the scintillator, this may be accomplished by the provision of a sprocket wheel 39, as shown, having either a single tooth or a plurality of equally spaced camming teeth arranged such that one of the teeth engages a notch in the film only during a portion of the rotary cycle of the sprocket wheel. Thus, the film is moved only during a portion of the time that the sprocket wheel is turned and remains stationary during the rest of the cycle, referred to as the dwell-time.

It is noted that the oil bath 29 completely covers the film 28 including both the supply and takeup spools 36, 35, and also covers the scintillator 27. In addition to maintaining the film in a suitable moisture-free environment, which is of particular advantage under high temperature operation, this arrangement also assures that the light output from the scintillator 27 is coupled efficiently to the film 28. Moreover, this arrangement also affords temperature stabilization for both the film 28 and the scintillator 27.

In order to provide means for expansion of the oil bath 29, a space is provided within the housing 26 above the oil bath 29. Ordinarily, this space should be filled with air. The air should be relatively dry. In accordance with a further embodiment of the invention, it is contemplated to provide a bellows in association with the oil bath in order to provide for expansion and contraction thereof with temperature variations. The use of a bellows avoids aeration of the oil bath which might lead to the formation of gas bubbles on the surface of the film.

In carrying out a well logging operation in accordance with the present invention, photographic film is loaded onto the film transport assembly of the radiation detection and measurement unit and the film is submerged completely in moisture-free oil. Pellucid oil which has been previously rendered moisture-free as by boiling is suitable. It has been found that white petrolatum is satisfactory. So-called synthetic oils, such as the silicones, are also satisfactory. The detection and recording unit with the film in the oil is positioned within a logging instrument together with an appropriate radiation source, as for example, a source of neutrons where a neutron gamma log is to be made, and the instrument is passed through the bore hole while a recording is made at the surface of the earth showing the position of the instrument in the bore hole with time. While the instrument is in the bore hole, the film is moved past the scintillator unit intermittently, such that the film is exposed to the light-output of the scintillator during a predetermined dwell-time during which radiation detection by the luminophor is converted to light which causes fogging of the film in proportion to the amount of detected radiation integrated over the dwell-time. After the instrument has been moved in the bore hole to successive positions, while the film is likewise transported to successive exposure positions, both in correlation with time, the instrument is brought to the surface of the earth, and the film is removed from the oil bath. The oil is cleaned from the film through the use of a suitable solvent for the oil which does not adversely affect the film. Petroleum ether has been found to be suitable for this purpose. Then, the film is developed in order to bring forth the latent image caused by exposure to the output of the luminophor. After the film is processed, including developing and fixing, it may be analyzed to determne the density of the various fogged portions or spots produced as the result of radiation detected by the scintillator. Preferably, in order to carry out such an analysis, the film is transported past a densitometer, and a record made correlating the density of successive dots on the film with the depth of the instrument at the time that the respective dots were exposed to light result from penetrative radiation in the well bore. Thus, a plot of the amplitude of the detected radiation versus depth of the instrument in the bore hole gives a log of detected radiation integrated over the selected dwell-time.

The photographic film employed in carrying out the present invention should be reasonably fast and it should have a relatively uniform density when developed. An appropriate photographic film is that manufactured by the Eastman Kodak Company and marketed under the label of "Tri-X." This is a relatively fast photographic film having an ASA emulsion speed rating of approximately 200 or higher in daylight. It has been discovered that satisfactory results are attainable with the Eastman Tri-X film when developed in Eastman D-23 developer with an anti-fog solution.

Figure 4:
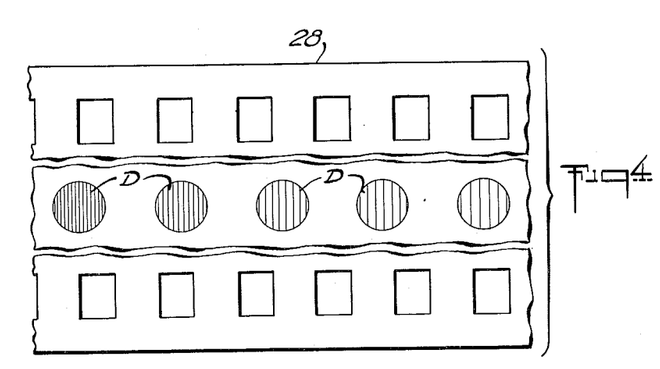
FIGURE 4 shows a portion of a typical record on photographic film produced by the apparatus shown in FIGURE 1 in carrying out a log of an earth formation in accordance with the invention.

In carrying out a neutron-gamma log in accordance with the invention, it has been found satisfactory to employ a 200 M.G. RaBe source of neutrons with a self-contained detecting and recording unit comprising a 1″ long x 3″ diameter sodium iodide crystal optically coupled through oil to Tri-X film immersed in the oil. An appropriate exposure time is of the order of one to two minutes in duration for each exposure spot or portion of the film when developed in Eastman D-23 developer. An illustration of a typical photographic film produced in accordance with the invention is shown in FIGURE 4 wherein there is shown a row of round spots D comprising fogged portion of film produced by the detector scintillator 27 in response to the detected radiation.

Referring now to FIGURE 2, there is shown another embodiment of a self-contained radiation detection and recording unit 23a, corresponding to the unit 23 of FIGURE 1. The modified unit 23a is illustrated in side view and is substantially identical with the unit 23 of FIGURE 1, except for the provision of a modified scintillator unit.

In particular, in addition to a signal detecting scintillator 27, like that of FIGURE 1, there is also provided a monitor scintillator 41 which includes a monitor luminophor 42 that is preferably identical with the detector luminophor 30, except that it should be much smaller in size. The monitor luminophor 42 should be substantially smaller than the detector luminophor 30 so that it will not count radiation to be detected as the detector luminophor 30 does. There is also provided a monitor source of radiation 43 that is preferably a gamma-free beta ray emitter having a sufficiently long half-life to assure a uniform flux throughout a logging operation and preferably over a series of such operations. For example, strontium 90, technetium 99, and tritium are pure beta ray emitters having appropriate half lives. The monitor source 43 is positioned adjacent the monitor luminophor 42 and should be separated from the film 28 to avoid fogging it by direct radiation. The side of the monitor luminophor facing the film 28 is provided with an appropriate glass-cover and reflecting cover of aluminum foil or aluminum oxide for confining its scintillation output with the exception of a small opening corresponding to that provided in the detecting luminophor 30. The two luminophors 30 and 42 are positioned side-by-side opposite the film such that the light output from both luminophors may expose separate adjacent portions of the film. The two luminophors 30 and 42 are displaced from another with respect to the longitudinal axis of the film, such that their respective outputs provide parallel rows of exposed portions of film as the unit 23a is operated.

Referring now to FIGURE 3, there is shown still another embodiment 23b of the units 23 and 23a shown in FIGURES 1 and 2. The unit 23b is substantially like the unit 23a of FIGURE 2, except that the monitor scintillator 41 is positioned a short distance away from the detecting scintillator 27 along the path of travel of the film. This enables the monitor 41 to be positioned above the detecting scintillator 27 such that the monitor 41 does not obstruct the detection of radiation from an adjacent earth formation. If the rate at which the film is transported is sufficiently great in relation to the distance that the logging instrument 16 is moved through a well bore, ambient conditions will not change so rapidly as to require that the detecting scintillator 27 and the monitoring scintillator 41 be positioned side-by-side.

Figure 5:
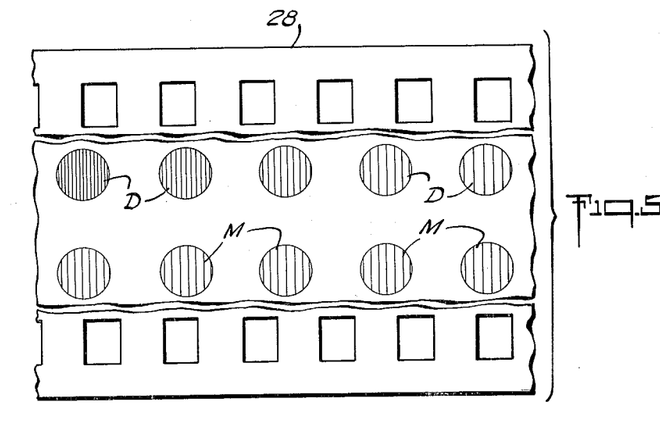
FIGURE 5 shows a portion of a typical record on photographic film produced by the apparatus shown in FIGURES 2 or 3 in carrying out a log of an earth formation in accordance with the invention.

Referring now to FIGURE 5, there is shown a typical film strip 28, as produced by the apparatus of FIGURE 2. This strip shows a row of round signal or detector spots D comprising fogged portions of film produced by the radiation detector scintillator 27. The density of the respective spots D produced by the signal detecting luminophor varies in accordance with the detected radiation. Below the detector spots D is shown a row of round spots M comprising fogged film portions produced by the monitor scintillator 41. Ordinarily, the density of the monitor spots M is determined by the intensity of the scintillations produced in the monitor luminophor due to the presence of the monitor source which will produce a substantially fixed radiation flux during a given period of time. The intensity of the radiation transmitted from the monitor source to the monitor luminophor should be selected, or controlled by means of appropriate shielding, such that the light output of the monitor luminophor is of appropriate intensity to fog the photographic film to such an extent that the density of the monitor spots lies somewhere in the mid-density range of the film, i.e., the monitor spots should not be extremely dense nor extremely transparent. Since both the detecting luminophor and the monitoring luminophor 41 are subjected to the same ambient conditions in the well bore for corresponding periods of time, and since the two luminophors have substantially the same characteristics and reaction to the changes in ambient conditions, and since both the monitor spots M and the detector spots D are produced on nearby portions of the same film strip, which is subjected to the same development and other processing, any change in the average density of the monitor spots M serves as a guide or reference for evaluating variations in density in the signal spots D produced by the detecting luminophor in response to detected radiation.

Figure 6:
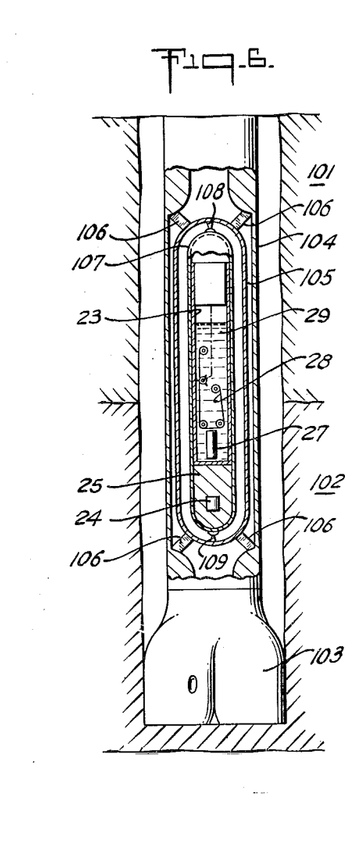
FIGURE 6 is a vertical elevation, partly in cross-section, through a portion of a bore hole showing a logging while drilling instrument employing principles of the invention.

Referring now to FIGURE 6, there is shown successive earth formations 101, 102, penetrated by a drill bit 103 attached to the lower end of a drill string 104. Within the drill string 104, in the vicinity of a drill bit 103, there is positioned a logging-while-drilling housing or outer capsule 105 which contains instrumentation generally like that of the logging instrument 16 shown in FIGURE 1. The outer capsule 105 is mounted within a section of the drill string 104 in spaced relation from the inner surface thereof, as by means of appropriate mounting studs 106, in such manner that the drilling fluid is free to pass downwardly through the drill string 104 around the outer capsule 105, and onto the drill bit 103 where it may perform its usual functions in connection with the operation of the drill. Preferably, the outer capsule 105 is mounted as close to the drill bit 103 as practical considerations permit in order to assure that the logging apparatus is employed to observe and analyze the earth formations as closely as possible to the bottom of the drill hole and further to assure that the log is conducted as soon as possible after the drill cuts through the formations and prior to possible invasion and/or contamination of the formations by the drilling fluid. Advantageously, therefore, the capsule 105 may be mounted within a section of drill pipe located between the drill bit and the usual drill collar (not shown). The outer capsule 105 is of relatively rugged construction in order that it may withstand the pressures and temperatures found in the region of the drill bit during the drilling operation. The outer capsule 105 is of fluid-tight construction in order to prevent seepage of fluids to the interior thereof, which contains the actual logging instrument. The logging instruments are maintained within an inner housing or capsule 107 that is mounted in such manner that it is free to rotate on its vertical axis independently of the rotary motion of the drill bit. This is preferably accomplished by mounting the inner capsule 107 to the outer capsule 105 by means of upper and lower thrust bearings 108, 109. The instrumentation contained within the inner housing 107 corresponds to that shown in FIGURE 1.

In order to carry out a radioactivity log of the earth formations 101, 102 during the course of drilling a bore hole therethrough, the radiation detection and recording apparatus of the present logging-while-drilling apparatus may be set in continuous operation during the drilling of the bore hole such that the film 28 is transported past the detecting scintillator intermittently at a predetermined rate and with fixed dwell-times between transport thereof in order that successive fogged portions of the film are correlated with time. There is thus provided a record of detected radiation that is correlated with time. During the course of drilling, a record is also made of the surface of the earth showing the position of the logging instrument in the bore hole with time. After the drill has progressed for a desired distance in a measured time, the drill string is withdrawn from the bore hole and the film is removed from the logging apparatus and processed in order to develop the latent image indicative of detected radiation. Since both the position of the fogged film portions in the instrument and the position of the instrument in the bore hole are correlated with time, the various fogged portions can be readily correlated with the depth of the instrument when exposed to radiation. As in the case of a logging record on photographic film produced by the apparatus of FIGURE 1, the record on film produced by the logging-while-drilling apparatus of FIGURE 6 may be analyzed and employed to produce a final log through the use of the apparatus shown in FIGURE 11 and described in more detail hereinafter.

Figure 7:
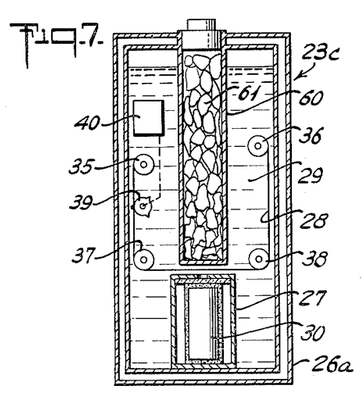
FIGURE 7 is a vertical elevation, partly in cross-section, showing still another embodiment of the self-contained unit shown in FIGURES 1–3.

Referring now to FIGURE 7, there is shown still another embodiment 23c of the radiation detection and recording units 23, 23a, 23b shown in FIGURES 1, 2, and 3, respectively. In the modified embodiment 23c of FIGURE 7, the scintillator 27 corresponds to that of FIGURE 1. Likewise, a monitor scintillator (not shown) may be employed adjacent the detecting scintillator 27 as in the case of the units 23a and 23b of FIGURES 2 and 3. The side walls 26a of the unit 23c are formed of thermal insulating material and may advantageously comprise a double-walled container with a vacuum between the inner and outer walls so as to form an insulating chamber of the type known as a Dewar flask. Within the unit 23c, there is provided further a temperature stabilizing and cooling device 60 which is inserted within the unit 23c in intimate contact with the oil bath 29. The device 60 is preferably a tubular container that is inserted into a threaded opening at the top of the unit 23c and which is filled with a coolant 61. The coolant 61 is preferably a material that maintains a constant low temperature through change of physical state and preferably comprises ice, i.e., water in the frozen state which assumes a constant low temperature of 0° C. as it melts.

The embodiment illustrated in FIGURE 7 affords the further advantages of maintaining the combination detecting and recording unit 23c at a substantially constant relatively low temperature throughout a prolonged period of operation. The oil bath 29 employed in the modified unit 26a not only performs the function of coupling light from the scintillator 27 to the film 28, but also acts as a heat transfer medium to couple the coolant 61 in the device 60 to both the film 28 and the luminophor 27.

It is to be understood that the features of this embodiment of the radiation detecting and recording unit relating to thermal insulation and temperature stabilization may be advantageously employed in carrying out the invention as shown in the other figures of the drawing and as described elsewhere herein.

Figure 8:
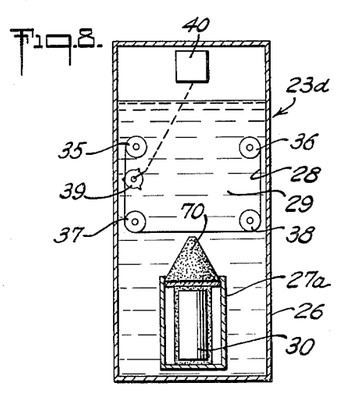
FIGURE 8 is a vertical elevation, partly in cross-section showing still another embodiment of the self-contained unit shown in FIGURES 1–3 and 7.

Referring now to FIGURE 8, there is shown a further embodiment 23d of the self-containing unit shown in the preceding figures. The distinguishing feature of the modified self-contained unit 23d of FIGURE 8 resides in the use of a plastic light-pipe 70 to couple the scintillator 27 to the photographic film 28. In this embodiment of the invention, the light-pipe 70 should be formed of a material such as that sold under the trademark "Lucite." The Lucite light-pipe serves to match the index of refraction of the luminophor to the oil which, in turn, couples the output of the luminophor to the photographic film. Efficient optical coupling is assured since the index of refraction of the material that the light is entering, namely the oil, is equal to or larger than the index of refraction of the material from which the light is emitted, namely, the Lucite.

The embodiment of FIGURE 8 is illustrated with a light-pipe 70 having a tapered configuration. In this case the base portion of the tubular luminophor which receives the light output of the scintillator 27a is exposed to substantially the whole upper surface of the luminophor and is tapered gradually until at its upper end the diameter of the light-pipe 70 is of the order of the diameter of the desired exposure spot for the photographic film 28 and may be, for example, of the order of ⅛" in diameter. The sides of the generally conical light-pipe 70 may be coated with an opaque material to prevent fogging of the film outside of the desired spot area. Although the light-pipe 70 is shown in the form of a tapered tubular member or cone, it is contemplated that a straight-sided tubular member, i.e. in the form of a rod of generally uniform diameter along its length may be employed. In the latter case, the end of the light-pipe rod should be appropriately masked, as by means of a foil or coating to limit the output to the desired small spot size of the order of ⅛" or so in diameter. Although only a detector luminophor 27a is illustrated in FIGURE 8, it is to be understood that a monitor luminophor may also be coupled to the film in the same manner, i.e. through the use of a light-pipe such as the one employed with the detector luminophor 27a.

Figure 9:
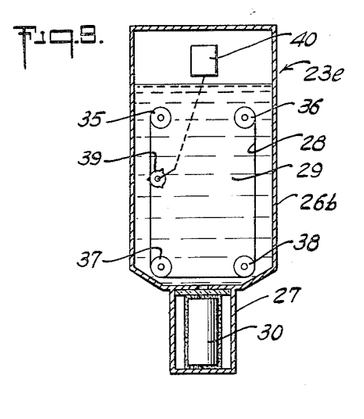
FIGURE 9 is a vertical elevation, partly in cross-section, showing still another embodiment of the self-contained unit shown in FIGURES 1–3, 7–8.

Referring now to FIGURE 9, there is shown still another embodiment 23e of the self-contained unit shown in the preceding figures. The modified unit 23e of FIGURE 9 includes a modified form of housing or container 26b for the film transport assembly wherein the photographic film is moved along near the bottom of the container 27b with the luminophor unit 27 positioned outside of the container 26b and thus outside of the oil bath. In accordance with this embodiment of the invention, penetrative radiation may impinge upon the scintillator 27 without travelling through the oil bath, as in the other illustrated embodiments of the invention. It is noted, however, that in this embodiment the output of the luminophor is, nevertheless, coupled to the photographic film through the oil bath in which the film is maintained. It is contemplated that this form of the invention may be advantageous, especially in those cases where the presence of the oil bath may interfere with the detected signal. This embodiment may be advantageous in carrying out a neutron log. For example, the oil bath may, in certain instances, result in a slowing down or moderation of fast neutrons due to the presence of hydrogen therein. Moreover, the hydrogen content of the oil bath may result in capture of thermal neutrons which also results in the production of neutron-capture gamma rays. In order to avoid these results in cases where they may interfere with the logging operation, it may be further desirable to interpose appropriate radiation shielding between the oil bath and the luminophor.

It is also contemplated that a light-pipe, such as that shown in FIGURE 8, may be employed to couple the scintillator to the photographic film in cases where the scintillator is mounted outside of the oil bath as in the case of the embodiment of FIGURE 9.

Figure 10:
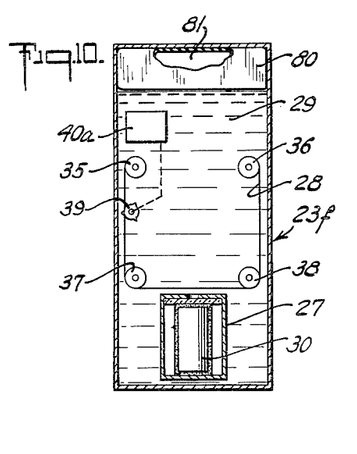
FIGURE 10 is a vertical elevation, partly in cross-section, showing still another embodiment of the self-contained unit shown in FIGURES 1–3, 7–9.

Referring now to FIGURE 10, there is shown a further embodiment 23f of the self-contained unit illustrated in the preceding figures. This embodiment features the use of a bellows 80 positioned above and in contact with the upper surface of the oil bath 29. The bellows 80 advantageously comprises a container of rubber-like material filled with a resiliently compressible material, such as air 81 and serves to provide for expansion of the oil 29 while maintaining the area above the surface of the oil free of air and moisture. In this embodiment of the invention, the motor 40a, which serves the same purpose as the motor 40 of the other figures of the drawing, is shown submersed below the surface of the oil 29. However, it is not essential that a submersed motor be employed in the event that a structural arrangement is selected such that the placement of the motor does not interfere with the presence and operation of the bellows 80.

It is to be understood that various features of the respective embodiments of the invention may be combined with one another in achieving a desired operative structure. For example, the bellows arrangement illustrated in FIGURE 10, may be incorporated with the features of the other embodiments described herein. It is also to be understood that the embodiments of the radiation detecting and recording unit shown in various figures of the drawings, as well as various combinations thereof, may be employed in the well logging apparatus of both FIGURES 1 and 6.

Figure 11:
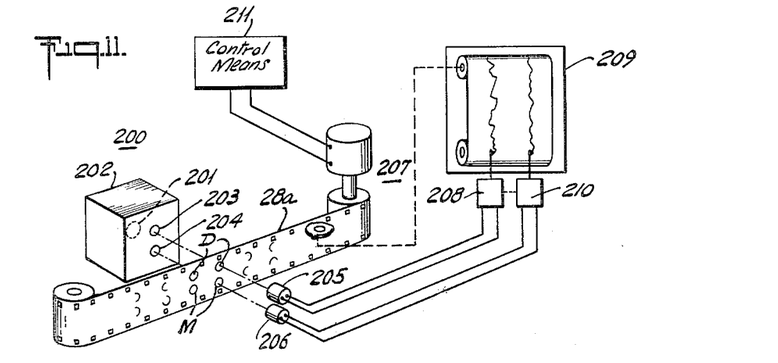
FIGURE 11 shows apparatus for evaluating a photographic record produced by the self-contained unit of the foregoing figures, and for producing a final log in response thereto.

Referring now to FIGURE 11, there is shown apparatus 200 for analyzing a processed photographic film 28a such as may be provided by logging a bore hole with apparatus including the self-contained detecting and recording unit described above. The apparatus of FIGURE 11 provides means for measuring the density of the signal spots D indicative of detected penetrative radiation and further provides means for measuring the density of the monitor spots M which serve as a reference in evaluating the density of the signal spots D. The apparatus for analyzing the film 28a comprises a light source 201 contained within a box-like housing 202 that is provided with upper and lower apertures 203, 204 for directing separate light beams through the film 28a, at the position of the detector and monitor spots D and M. Opposite the upper and lower apertures 203, 204 there are positioned a detector photocell 205 and a monitor photocell 206, respectively. The film 28a to be analyzed is mounted on a film transport mechanism 207 such that it can be moved between the light source and the photocells. The detector spot D on the photographic film 28a is interposed between the source 201 and the detector photocell 205 such that the light reaching the photocell 205 varies with the average density of the individual signal or detector spot D. In like manner, the density of the monitor spot M controls the amount of light reaching the monitor photocell 206 from the source 201. The output of the detector photocell 205 is coupled through an amplifier 208 to a display device shown as a trace recorder 209. Similarly, the output of the monitor photocell 206 is coupled to a separate amplifier 210 to control a parallel trace on the same recorder 209.

As indicated schematically by the dashed line from the monitor amplifier 210 to the detector amplifier 208, it is also contemplated that the signal trace due to the detector spots may be continuously corrected for variations in density of the monitor spot by appropriate feedback from the monitor amplifier 210 to the detector amplifier 208 in order to control the gain of the detector amplifier as a function of the density of the monitor spots in accordance wtih well-known electronic techniques. For example, a signal derived from the output of the monitor amplifier may be employed to control the gain of the detector in a manner similar to that employed for automatically controlling the gain of one or more stages of amplification of a conventional radio receiver.

The film 28a is moved by means of the transport mechanism past the density measuring apparatus 200 intermittently in order to position each of the successive film spots D, M between the light source 201 and the photocells 205, 206 for a time interval sufficient for a density measurement to be made and recorded. The film area between the successive spots is ignored in evaluating the record, since its density is not indicative of the detected radiation. The film transport 207 is synchronized with the recorder 209, as shown by the dashed line, in order to assure correlation of the density measurement with the position of the trace on the record. A motor control 211 is shown schematically and may be a stepping arrangement for transporting the film 28a from one spot position to the next in accordance with a predetermined schedule. It is desirable to mark the depth of the logging instrument opposite various signal spots on the film 28a.

A radioactivity well log conducted in accordance with the present invention provides useful information concerning characteristics of the earth formations traversed by the well bore, which information is useful in determining whether or not certain other operations are to be performed in the bore hole and, if so, at which locations such operations should be performed. For example, this information may be useful in determining whether a well casing should be placed, to determine the interval over which cement should be placed behind the casing, and whether the casing should be perforated for the production of oil. It is important, therefore, that the exact location in the well bore at which a radioactivity logging measurement is made should be accurately determined. In order to assure correlation between the radioactivity well log and a subsequent operation in the well bore, a depth measuring apparatus may be employed to locate and record the position of the logging instrument in the well bore. In the case of a log conducted with apparatus associated with the drilling apparatus as shown in FIGURE 6, for example, a known type of apparatus may be employed to locate the position of the logging apparatus in the well bore. By way of example, apparatus may be employed for continuously recording the depth of the drill bit in the bore hole in correlation with time, such as the well-known apparatus involving mechanism for continuously recording a graph of the movements of the drill string in the well by recording movements of the travelling block which is attached to the drill string at the surface during the drilling operation in order to provide means for raising or lowering the drill string in the well bore. Such apparatus is marketed commercially by the Warren Automatic Tool Company under the name of "Rig-Runner." It is further contemplated that the well log may be correlated with a later operation in the well through the use of a marker, such as a radioactive bullet that is shot into the formation when the log is conducted and which serves as a reference point in the well and which may be later located by means of a detector in order to correlate the latter operation with the well log. Method and apparatus involving the use of a radioactive bullet as a marker in bore hole operations is disclosed, for example, in U.S. Letters Patent No. 2,592,434, issued April 8, 1952, to Shelley Krasnow. This is particularly important in the case of a log conducted in a deep well, which may be of the order of two to four miles in depth, and wherein the logging cable, or the drill string in the case of logging-while-drilling operation, may vary appreciably in length due to its own weight and due to variations in temperature.

It is noted that a monitor scintillator, such as that illustrated in FIGURES 2 and 3 of the drawing, may be employed in association with the detector scintillator illustrated in the other figures of the drawing. Moreover, it is noted that the monitor luminophor may be provided with appropriate shielding to exclude radiation of the type being detected by the detector luminophor in order to assure that the light output of the monitor luminophor is due substantially entirely to radiation emitted by the monitor source. Such a monitor shield should enclose most of the monitor luminophor except for the light output path to the film, and should also enclose the monitor source, as well. In those cases where the radiation to be detected by the detector luminophor comprises gamma rays, the monitor shield may be in the form of material such as lead. In those cases where neutrons are to be detected by the detector luminophor the monitor shield may comprise an outer layer of neutron moderating material, such as paraffin or polyethylene, in combination with an inner layer of thermal neutron capturing material, such as cadmium or boron. It may be necessary to provide still another layer of shielding material, such as aluminum, to exclude from the luminophor radiation such as alpha rays, caused by interaction of the thermal neutrons with the neutron capturing material.

Suitable apparatus for mounting the self-contained radiation detection unit of the present invention in the vicinity of a drill bit, as illustrated n FIGURE 6, for conducting a log while drilling a bore hole is shown in the co-pending application of R. J. Clements, B. D. Lee, and R. B. Stelzer, Serial No. 677,969, entitled Geophysical Prospecting Apparatus filed concurrently with this application on August 13, 1957.

Obviously, many modifications and variations of the invention, as hereinbefore set forth, may be made without departing from the spirit and scope thereof, and therefore only such limitations should be imposed as are indicated in the appended claims.

We claim:

1. A self-contained instrument for logging an earth formation traversed by a well bore, said instrument comprising a liquid-tight container, a quantity of oil within said container, means for detecting and recording penetrative radiation submersed in said oil, said detecting and recording means comprising a luminophor adapted to produce light rays in response to penetrative radiation and a photosensitive material optically coupled to the luminophor by means of said oil, and a resilient bellows for displacing vapors from the surface of the oil while permitting the oil to expand or contract.

2. A self-contained instrument for logging an earth formation traversed by a well bore, said instrument comprising a fluid-tight container, means for detecting and recording penetrative radiation within said container, said detecting and recording means comprising a luminophor adapted to produce light rays in response to penetrative radiation and a strip of photographic film optically coupled to the luminophor by means of oil, and means for moving said photographic film past the luminophor at a predetermined rate.

3. The apparatus of claim 2 wherein both said luminophor and said photographic film are submersed in the oil.

4. The apparatus of claim 2 wherein the film is submersed in the oil and the luminophor is positioned substantially entirely outside of the confines of the oil.

5. A self-contained instrument for logging an earth formation traversed by a well bore, said instrument comprising a fluid-tight container, means for detecting and recording penetrative radiation within said container, said detecting and recording means comprising a detector-luminophor adapted to produce light rays in response to penetrative radiation emanating from a formation in the vicinity of the instrument, a relatively constant source of penetrative radiation, a monitor luminophor exposed to said source, a strip of photographic film, means including an oil medium optically coupling said two luminophors to the film, and means for moving said photographic film past said luminophors at a predetermined rate.

6. The apparatus of claim 5 wherein both said luminophors and said photographic film are submersed in the oil.

7. The apparatus of claim 5 wherein the film is submersed in the oil and at least the detector-luminophor is positioned substantially entirely outside of the confines of the oil.

8. A self-contained instrument for logging an earth formation traversed by a well bore, said instrument comprising a fluid-tight container, means for detecting and recording penetrative radiation within said container, said detecting and recording means comprising a luminophor adapted to produce light rays in response to penetrative radiation, a strip of photographic film optically coupled to the luminophor by means of oil, at least said photographic film being submersed in said oil, means for moving said photographic film past the luminophor at a predetermined rate and means for thermally insulating said detecting and recording means from the ambient temperature of the well bore.

9. A self-contained instrument for logging an earth formation traversed by a well bore, said instrument comprising a fluid-tight container, a quantity of oil within said container, means for detecting and recording penetrative radiation submersed in said oil, said detecting and recording means comprising a luminophor adapted to produce light rays in response to penetrative radiation and a strip of photographic film optically coupled to the luminophor by means of said oil, means for thermally insulating the oil containing said detecting and recording means from the ambient temperature of a well, and cooling means in thermal contact with said oil for stabilizing the temperature of said detecting and recording means.

10. Apparatus for logging an earth formation traversed by a well bore during the course of drilling a well comprising a sealed housing mounted within a tubular member comprising a portion of a drill string in the vicinity of the drill bit, said housing being spaced from said member in order to provide a passageway for drilling fluid passing through the drilling string to the drill bit, a self-contained logging instrument within said housing, said instrument being mounted for free rotation about its vertical axis, said instrument including a detector adapted to produce light rays in response to penetrative radiation, a photosensitive material opposite said detector, and means including an oil medium for coupling light output from said detector to said photosensitive material.

11. The method of logging a bore hole to provide a record of a characteristic of the earth formations traversed by the bore hole which comprises passing a scintillator through the bore hole in order to intercept radiation and produce light pulses in response to said radiation, transmitting said light pulses through an oil medium to a predetermined portion of a strip of photosensitive material while maintaining at least said portion of the strip of photosensitive material submersed in said oil, moving said strip relative to the scintillator in order to expose successive portions thereof to light pulses transmitted through said oil medium from the scintillator, correlating the position of the successive portions of said strip with the position of the scintillator in the bore hole during the times of exposure of the respective portions to said light pulses, and determining the effect on the photosensitive material produced by the light rays from the scintillator as an indication of the intensity of the radiation impinging upon the scintillator.

12. The method of logging a bore hole to provide a record of a characteristic of the earth formations traversed by the bore hole which comprises passing a strip of photosensitive material through the bore hole, simultaneously passing a scintillator through the bore hole in the vicinity of said photosensitive material in such manner as to intercept radiation by means of said scintillator in order to produce light pulses in response to said radiation maintaining at least a portion of said strip of photosensitive material submersed in an oil medium while, transmitting said light pulses through said oil medium to said submersed portion of the photosensitive material for a predetermined time interval, recording the position of said scintillator in the well bore during said predetermined time interval, moving said strip relative to the scintillator in order to expose successive portions of the photosensitive strip to light pulses transmitted through said oil medium to said successive portions while submersed in the oil medium for successive predetermined time intervals, recording the position of said scintillator in the well bore during said successive predetermined time intervals, removing said photosensitive material from the well bore, and determining the effect on the photosensitive material produced by the light rays during said predetermined time intervals as an indication of the intensity of the radiation emanating from the earth formations at said positions in the well bore.

13. The method of logging a bore hole to provide a record of a characteristic of the earth formations traversed by the bore hole which comprises immersing a strip of photographic film in a moisture-free oil bath and while so immersed passing said strip through the bore hole, simultaneously passing a scintillator through the bore hole in the vicinity of said photographic film in such manner as to intercept radiation by means of said scintillator in order to produce light pulses in response to said radiation, transmitting said light pulses through said oil to the photographic film immersed therein for a predetermined time interval, recording the position of said scintillator in the bore hole during said predetermined time interval, removing said photographic film from the bore hole, and determining the effect on the photographic film produced by the light rays during said predetermined time interval as an indication of the intensity of the radiation emanating from the earth formations at said position in the bore hole.

14. The method of logging a bore hole to provide a record of a characteristic of the earth formations traversed by the bore hole which comprises immersing in a moisture-free oil bath a strip of photographic film comprising a sensitized gelatinous emulsion on a film base and while so immersed passing said strip through a region of the bore ole having an ambient temperature of the order of at least 100° F., simultaneously passing a scintillator through the bore hole in the vicinity of said photographic film in such manner as to intercept radiation at successive positions along the bore hole by means of said scintillator in order to produce light pulses in response to said radiation, transmitting said light pulses through said oil to successive portions of the photographic film immersed therein for successive time intervals of predetermined duration, recording the position of said scintillator in the bore hole during each of said predetermined time intervals removing said photographic film from the bore hole, processing said film to develop the density of said film in proportion to its exposure to light rays, and determining the density of the successive portions of the film produced by the light rays during each of said predetermined time intervals as an indication of the intensity of the radiation coming from the earth at the successive positions along the bore hole.

15. The method of logging a bore hole to provide a record of a characteristic of the earth formations traversed by the bore hole which comprises immersing in a moisture-free oil bath a strip of photographic film comprising a sensitized gelatinous emulsion on a film base and while so immersed passing said strip through a region of the bore hole having an ambient temperature of the order of at least 100° F., simultaneously passing a scintillator through the bore hole in the vicinity of said photographic film in such manner as to intercept radiation at successive positions along the bore hole by means of said scintillator in order to produce light pulses in response to said radiation, transmitting said light pulses through said oil to successive portions of the photographic film immersed therein for successive time intervals of predetermined duration, recording the position of said scintillator in the bore hole during each of said predetermined time intervals, removing said photographic film from the bore hole, processing said film to develop the density of said film in proportion to its exposure to light rays, recording a signal proportional to the density of the successive portions of the film produced by light rays during each of said predetermined time intervals as an indication of the intensity of the radiation coming from the earth at the successive positions along the bore hole, and recording in correlation with said signals the position in the bore hole at which the corresponding radiation was intercepted by the scintillator.

16. The instrument of claim 5 further characterized in that the monitor luminophor is substantially smaller than the detector luminophor to such an extent that the monitor luminophor is significantly less sensitive to radiation to be detected by the detector luminophor.

17. Apparatus as defined in claim 9 wherein the means for stabilizing the temperature of said detecting and recording means includes a material which maintains a constant temperature through change of physical state.

18. A self-contained instrument for logging an earth formation traversed by a well bore, said instrument comprising a fluid-tight container, means for detecting and recording penetrative radiation within said container, said detecting and recording means comprising a detector-luminophor adapted to produce light rays in response to penetrative radiation emanating from a formation in the vicinity of the instrument, a relatively constant source of penetrative radiation, a monitor luminophor exposed to said source, a strip of photographic film, means optically coupling said two luminophors to the film, and means for moving said photographic film past said luminophors at a predetermined rate.

19. Apparatus for logging an earth formation traversed by a well bore during the course of drilling a well comprising a sealed housing mounted within a tubular member comprising a portion of a drill string in the vicinity of the drill bit, said housing being spaced from said member in order to provide a passageway for drilling fluid passing through the drilling string to the drill bit, a self-contained logging instrument within said housing, said instrument being mounted for free rotation about its vertical axis, said instrument including a detector adapted to produce light rays in response to penetrative radiation, a photosensitive material opposite said detector, and means for coupling light output from said detector to said photosensitive material.

20. Apparatus for conducting a radioactivity well log during the course of drilling a well which comprises an instrument as defined in claim 9, further characterized in that it is mounted within a drilling string in the vicinity of a drill bit.

References Cited in the file of this patent

UNITED STATES PATENTS

| | | |
|---|---|---|
| 2,349,366 | Moon | May 23, 1944 |
| 2,428,034 | Nichols et al. | Sept. 30, 1947 |
| 2,711,084 | Bergan | June 21, 1955 |
| 2,721,056 | Storm | Oct. 18, 1955 |
| 2,759,143 | Arps | Aug. 14, 1956 |
| 2,782,318 | Herzog | Feb. 19, 1957 |
| 2,824,233 | Herzog | Feb. 18, 1958 |